J. L. FOUNTAIN.
Harvester Rake.
No. 19,085.
Patented Jan'y 12, 1858.
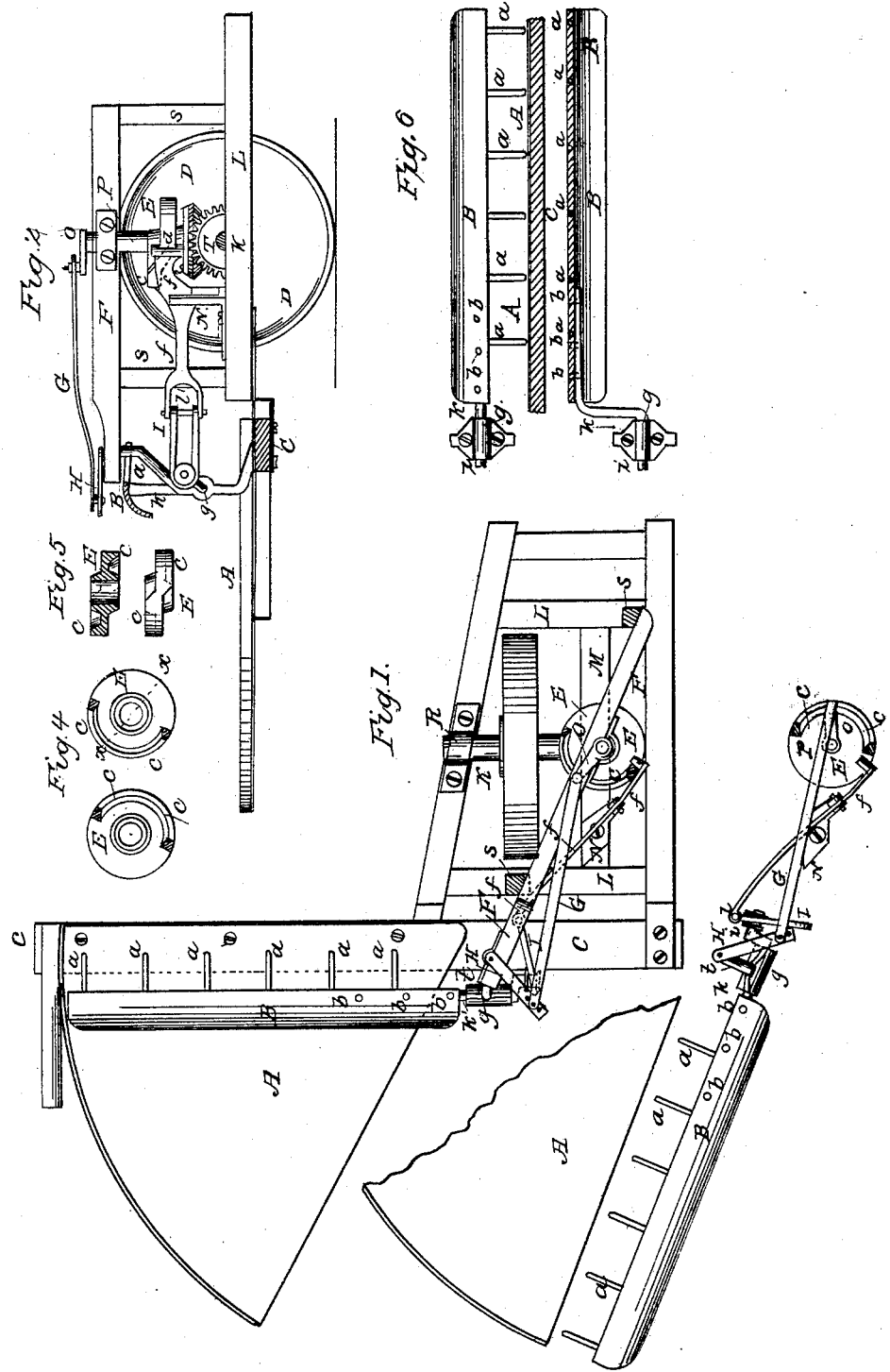

UNITED STATES PATENT OFFICE.

JAMES L. FOUNTAIN, OF ROCKFORD, ILLINOIS.

IMPROVED RAKING ATTACHMENT FOR HARVESTERS.

Specification forming part of Letters Patent No. 19,085, dated January 12, 1858.

*To all whom it may concern:*

Be it known that I, JAMES L. FOUNTAIN, of Rockford, county of Winnebago, in the State of Illinois, have invented a new and useful Improvement in Raking Attachments for Harvesters; and I do hereby declare that the following is a full and exact description thereof, reference being had to the accompanying drawings, and to the letters of reference marked thereon.

The nature of my invention consists in certain improvements in the construction and mode of operating the raking apparatus of harvesters, to be hereinafter described.

To enable others skilled in the art to make and use my invention, I shall proceed to describe its construction and operation.

In the accompanying drawings, forming part of this specification, Figure 1 is a plan of my improvement; Fig. 2, a side elevation; Fig. 3, a skeleton view of rake apparatus; Fig. 4, a top and bottom view of cam-wheel; Fig. 5, side view and vertical section of cam, and Fig. 6 detail views of rake in two positions.

Similar letters in the several figures refer to similar parts.

By the frame L the parts of the machine are supported and maintained in their positions. The axle or shaft K of the driving-wheel D is supported, one end at R by the frame L and the other by the cross-beam M.

P is the cam-wheel shaft, supported perpendicularly between the beam M and the cross-piece F, connected to the frame L by the uprights S S.

C is a strong beam, upon which the platform A is secured, and serving also to support the lower pivot of the crank-shaft $g$.

T is a bevel-wheel attached to the end of the driving-wheel shaft, which passes through the beam M; U, another bevel-wheel, meshing into T and fast upon the cam-wheel shaft P.

E is the cam-wheel, the construction of which is best seen at Figs. 4 and 5, $c\ c$ being the elevated rims above and below, operating as will be presently shown.

O is a crank attached to the top of the shaft P; G, a pitman connecting the crank O with the arm H of the shaft $g$.

B is the rake-head, and is constructed of the curved form shown in the several figures, for purposes hereinafter shown; $a$, the rake-teeth; $k$, the rake-arm, attached to the inside of the head B by the rivets $b\ b\ b$, and constructed as represented in the drawings, passing through the shaft $g$, and terminating in the crank $i$.

N is a support to which the arm or lever $f$ is pivoted. This lever $f$ is constructed as seen in Fig. 2, one end, $d$, clasping the cam-wheel and the other hinged to the loop I by the pin $l$, this loop I clasping the neck of the crank termination $i$ of the rake-arm $k$ between two washers, as best seen in Fig. 3.

Having now described all the parts of my improved raking apparatus, I shall proceed to show its operation.

Motion being given to the driving-wheel D, the cam-shaft P is caused by the bevel-gearing T U to revolve from left to right. The relative lengths of the crank-arms O and H are so adjusted that one revolution of O shall cause the arm H to move only a segment of a circle and return, which segment shall correspond to the size of the platform A, over which the rake is moved. The motion thus communicated to the crank-arm H is transferred directly to the rake through the shaft $g$ and rake-arm $k$, and at each half-revolution of the shaft P the rake moves from one side of the platform to the other. Upon the same shaft, to the upper end of which is bolted the crank O, is secured the double cam E, which is so adjusted with regard to the position of said crank that when the rake is moving from the front to the back edge of the platform the end $d$ of the lever $f$ shall traverse the higher portion of its circumference, and when the rake returns for another gavel $d$ traverses the lower portion, by which means the lever $f$ elevates and depresses the crooked arm $i$, thus throwing the rake alternately upward out of the way of the fallen and falling grain and downward to perform its legitimate functions.

The use of the loop I is to allow the swinging of the shaft $g$ and parts moving with it without affecting the operation of the lever $f$, which is stationary except at each half-revolution of the cam-wheel E—that is, in changing the rake from its upward to its downward position, and vice versa.

Having now fully described the construction and operation of my improved raking attachment, what I claim as my invention, and desire to secure by Letters Patent, is—

The automatic raking attachment, as herein described, consisting of the double cam-wheel E, vibrating lever $f$, crooked arm $i$, and loop I, in combination with the cranks O and H, pitman G, and bent rock-shaft $g$, the whole constructed and arranged as and for the purpose set forth.

In testimony whereof I have, this 10th day of November, 1857, hereunto set my hand.

JAMES L. FOUNTAIN.

Witnesses:
BELA SHAW,
L. Y. CLARK.